United States Patent [19]

Thompson et al.

[11] Patent Number: 4,864,452

[45] Date of Patent: Sep. 5, 1989

[54] REMOVABLE CARTRIDGE WITH LOCKABLE ACCESS DOOR

[75] Inventors: Herbert E. Thompson, Los Gatos; Donald L. Rolph, Pleasanton; Dominic Mercurio, San Jose, all of Calif.

[73] Assignee: Syquest Technology, Fremont, Calif.

[21] Appl. No.: 160,714

[22] Filed: Feb. 26, 1988

[51] Int. Cl.[4] ..................... G11B 23/02; G11B 5/012
[52] U.S. Cl. ................................ 360/133; 360/97.01
[58] Field of Search ............................. 360/133, 97.01

[56] References Cited

U.S. PATENT DOCUMENTS

| | | | |
|---|---|---|---|
| 3,812,534 | 5/1974 | Rousseau et al. | 360/133 X |
| 4,320,430 | 3/1982 | Vogt | 360/133 |
| 4,458,282 | 7/1984 | Mui et al. | 360/133 |
| 4,488,190 | 12/1984 | Oishi et al. | 360/97.01 |
| 4,550,354 | 10/1985 | Wakabayashi et al. | 360/133 |
| 4,559,575 | 12/1985 | Noto et al. | 360/133 |
| 4,608,617 | 8/1986 | Oishi et al. | 360/133 |

*Primary Examiner*—John H. Wolff
*Attorney, Agent, or Firm*—Fliesler, Dubb, Meyer & Lovejoy

[57] ABSTRACT

A removable cartridge 20 for a disc drive includes a door 34 which is movable from a locked closed position to an open position by a shutter lever of the disc drive.

12 Claims, 2 Drawing Sheets

REMOVABLE CARTRIDGE WITH LOCKABLE ACCESS DOOR

FIELD OF THE INVENTION

The present invention relates to removable cartridges for disc drives.

BACKGROUND OF THE ART

Heretofore there have been a number of cartridges available which contain memory media on rotatable discs which are usable with disc drives. In particular disc cartridges are available for use with disc drives containing heads which are movable into position relative to the disc by means of for example, stepper motors and linear voice coil motors. Heretofore no cartridges have been available which can be utilized with a disc drive utilizing the benefits of a radial arm voice coil actuator. It is advantageous to use a radial arm voice coil actuator as such actuators are economical and efficient to use in comparison to other types of actuators. Further these actuators allow for infinite positionability of the heads. The drawback with such actuators is that they require that the cartridge provide a large opening so that the actuator can move the heads into the cartridge and come in contact with the disc. Such openings are larger in comparison to the openings required for stepper motor actuators or linear voice coil actuators.

SUMMARY OF THE INVENTION

The present invention is directed to providing a removable cartridge containing a memory media which is usable with a disc drive having a radial arm voice coil actuator.

The present cartridge provides for the required opening suitable for access to the disc by a radial arm voice coil actuator while keeping the opening as small as possible. The cartridge provides for a door to completely seal the disc in the housing in order to prevent contamination while the cartridge is being stored apart from the disc drive.

The invention includes a cartridge containing a disc memory media comprising a housing with a peripheral edge, a hub and a disc fixedly mounted to the hub. Further a mount is provided for mounting the hub to the housing so that the hub and disc are free to rotate. A door is additionally provided for selectively allowing access to the disc. The door includes a shutter and a radial arm. The radial arm is pivotally mounted to the hub and includes a mechanism for urging the door to a closed position. Further there is a mechanism for locking the door in the closed position.

The shutter includes a flexible portion with at least one tab extending therefrom. The tab is insertable into a recess in the housing for locking the door into the closed position. A suitable disc drive includes a shutter lever suitably designed for urging the tab of the shutter out of the recess in the cartridge housing in order to cause the door to open. The door is curved and follows the curvature of the disc in order to provide a minimum opening while allowing the radial arm of the voice coil to swing into the cartridge.

At least one side of the housing includes a removed portion adjacent the curved door in order to allow access by the radial arm. Further internal arcuate recesses are provided for receiving the radial arm.

Accordingly, an object of the present invention is to provide a cartridge which has a door which in a closed position, along with the remainder of the housing, completely encloses the disc.

It is another object of the present invention to provide a door which is easily opened and urged out of the way so as to allow access by a radial arm voice coil actuator.

It is still a further object of the present invention to provide a locking mechanism for ensuring that the door is locked in the closed position.

It is yet another object of the present invention to provide a housing for the cartridge which allows easy access into the cartridge by a radial arm voice coil actuator.

BRIEF DESCRIPTION OF THE PREFERRED EMBODIMENT

Figure 1:
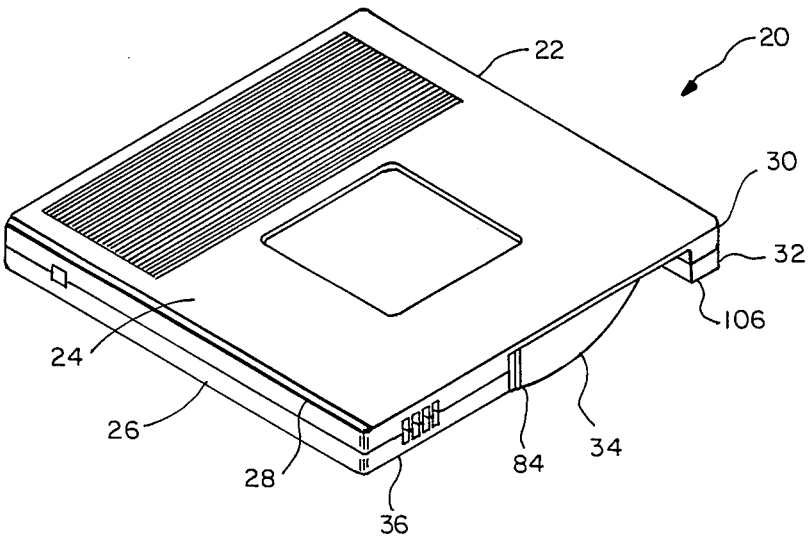
FIG. 1 is a perspective view of a embodiment of the cartridge of the invention.

With reference to the figures and in particular to FIG. 1, a preferred embodiment of a movable cartridge 20 for a radial arm voice coil actuated disc drive is presented. Further details about the disc drive can be obtained from a review of the co-pending application entitled "Removable Cartridge Disc Drive With Radial Arm Voice Coil Actuator", which received U.S. patent application Ser. No. 07/160,708 and a filing data of Feb. 26, 1988 and which has been assigned to the present assignee.

The movable cartridge 20 includes a housing 22 which has a top 24 and a bottom 26. The housing 22 includes a beveled edge 28 which is adapted to mate with a beveled portion of the disc drive in order to ensure that the cartridge is only inserted into the drive in one orientation. The top and the bottom 24, 26 each include a peripheral edge 30 and 32 respectively which are mated to each other and can be glued together by one of a number of known bonding agents.

The removable cartridge 20 further includes a movable door 34 and an air filter opening 36 which is partially formed in both the top and bottom 24, 26.

Figure 2:
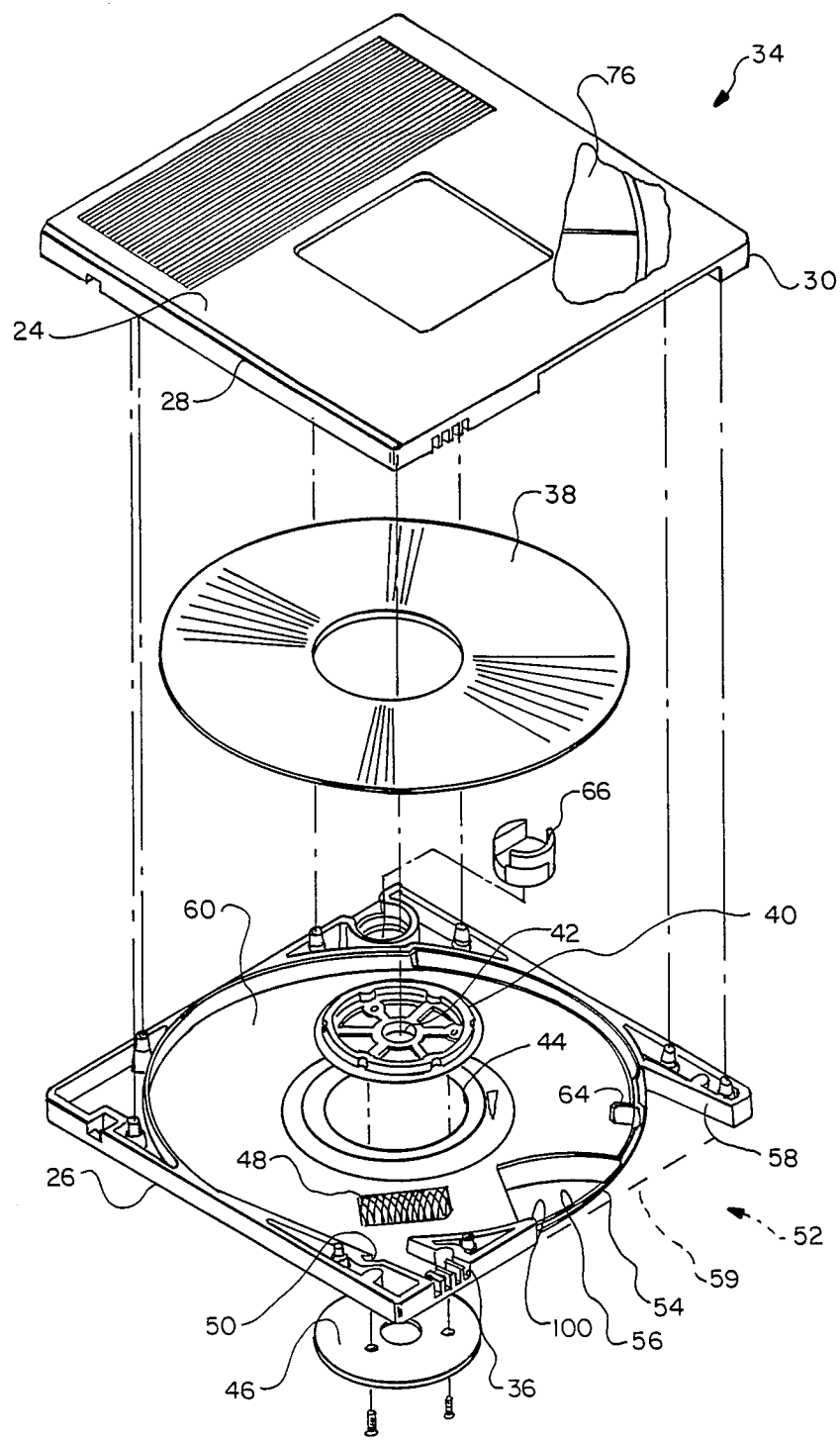
FIG. 2 is an exploded perspective view embodiment of FIG. 1.

As can be seen in FIG. 2, mounted to the bottom 26 of the housing 22 is a disc 38 which contains memory media onto which can be transferred information by the disc drive. The disc 38 is mounted on a hub 40 again by appropriate bonding agents which are known in the art. Mounted in the hub 40 are a set of teeth 42 which are used to engage the spindle of a disc drive. The hub is secured through a port 44 of the bottom 26 of a housing 22 by an appropriate armature plate 46. The combination of the armature plate and the hub allow the disc to spin freely in the cartridge and additionally to move perpendicularly with respect to the bottom 26 of the cartridge 20. As can be seen in FIG. 2 an air filter 48 is provided in an appropriate slot 50 adjacent the air filter opening 36.

The bottom 26 of the cartridge 20 includes a removed portion 52 which allows convenient and efficient access to the disc 38 by a radial arm voice coil actuator. The removed portion 52 is defined by a curve 54 which follows a shutter track 56. The shutter track 56 as will be described below, defines the path that the shutter 78 of door 34 can take from a fully closed to fully opened position. This removed portion 52 allows a radial arm voice coil actuator to swing into the cartridge through an arc from right to left in FIG. 2 with the pivot point of the arm being adjacent the air filter opening 36. The removed portion 52 is further defined by a leg 58 formed by a portion of the bottom 26 of the cartridge 20. The removed portion 52 is also defined by a phantom extension of the peripheral edge 32 which is shown at 59.

Further defined in the internal surface 60 of the bottom 26 of the cartridge 20 are arcuate recesses 62 and 64 which further accommodate the arm of a radial arm voice coil actuator. The bottom 26 further mounts a write protect button 66 which can be turned as appropriate to prevent accidental replacement/deletion of information previously stored on the disc 38.

Figure 3:
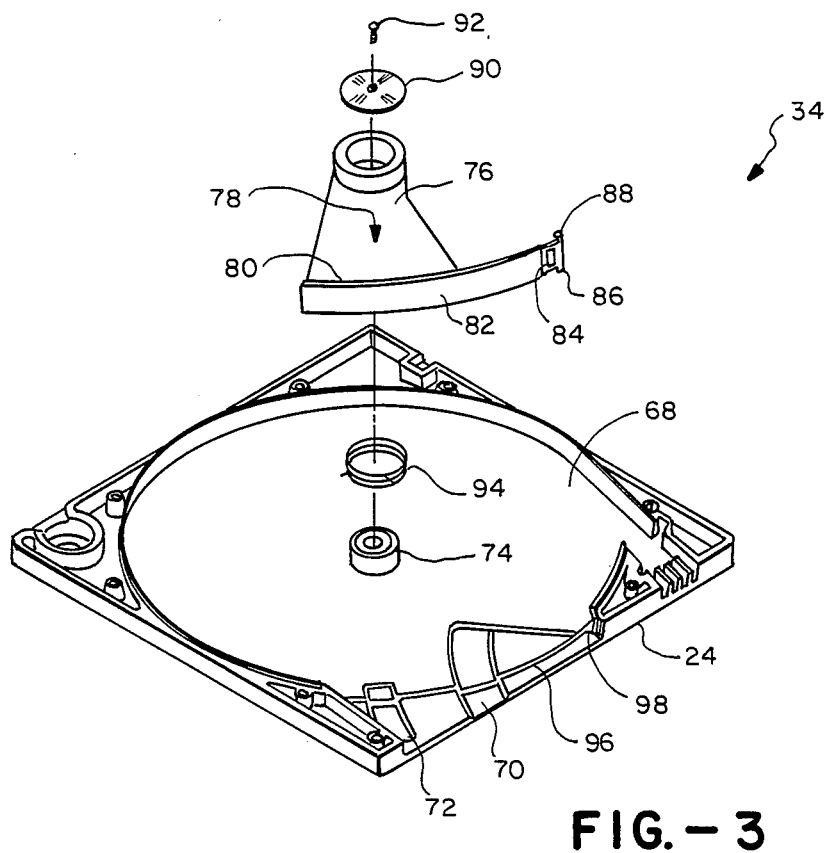
FIG. 3 a bottom perspective view of the top of the cartridge housing including the cartridge door.

FIG. 3 depicts the bottom view of the top 24 of the housing 22 of the cartridge 20. The internal surface 68 further defines arcuate recesses 70 and 72 which provide for ease of access of the radial arm voice coil actuator into the cartridge.

The center of the top 24 of the housing 22 includes a hub 74 which mounts the door 34. The door includes a radial arm 76 and a shutter 78. Shutter 78 as can be seen in FIG. 3 is in the shape of a curve and includes a first portion 80 which is rigid with respect to the radial arm 76 and a second portion 82 which is flexible with respect to the first portion 80. Extending from the second portion 82 is a catch 84 and also first and second tabs 86 and 88. Catch 84 is adapted to be engaged by a shutter lever of a disc drive.

The door 34 is mounted on the hub 74 with a retaining plate 90 and screw 92 such that the door 34 can be pivoted about said hub 74. A spring 94 is mounted between the hub 74 and the door 34 in order to cause the door to be biased to a closed position as shown in FIG. 1. FIG. 2 shows a door 34 in an open position.

As can be seen in FIG. 3, a shutter track 96 is provided in the top 24 for receiving an edge of the shutter 78. The shutter track 96 defines a offset recess 98 which can capture a tab 86. Similarly, the lower track 56 on the bottom 26 includes an offset recess 100 for capturing the tab 88. It is to be understood that the flexible portion 82 of the shutter 78 urges the tabs 86, 88 forwardly and outwardly from the cartridge and into the offset recesses 98, 100. It is further to be understood that the spring 94 biases the door 34 to a closed position as shown in FIG. 1 so that the tabs 86, 88 are automatically brought adjacent the offset recesses 98, 100.

In a preferred embodiment slightly over half of the side portion 106 combined peripheral edges 30, 32 of the cartridge 20 is exposed with the shutter in the open position to allow access by the radial arm voice coil actuator to the disc.

Industrial Applicability

The operation of the cartridge 20 is as follows. The cartridge is inserted into a disc drive such as that described in the above referenced co-pending patent application. As this occurs, a shutter lever of the disc drive comes into contact with the catch 84 located on the shutter 78. As the cartridge 20 is further inserted into the drive, the shutter lever which is pivotally mounted in the disc drive retains the catch 84 of the shutter 34 and causes the shutter to move to the open position as shown in FIG. 2. In effect, the shutter 78 is left behind as the cartridge 20 is pushed forward. This action causes the door 34 to pivot against the bias of the spring 94 to the open position.

The reverse operation occurs when the cartridge is removed from the disc drive.

It is to be understood that during the opening process that the shutter lever of the disc drive first urges the tabs 86 and 88 rearwardly out of the recesses 98, 100 prior to causing the shutter 78 to progress along the shutter track 56, 96 in an arcuate manner.

The advantage of the above removable cartridge 20 is that it is efficient and economical to produce while allowing the required access for a radial arm voice coil actuator. Further cartridge 20 also has the capability of being completely sealed by a door when cartridge 20 is removed from the drive in order to prevent contaminants from being collected in the cartridge. Other aspects and advantages of the present invention can be obtained from a review of the claims and the figures.

It is to be understood by one of ordinary skill in he art that other embodiments of the present invention can be developed which follow within the spirit and scope of the claims.

I claim:

1. A cartridge comprising:
   a housing defining first and second planar members, with disc memory media located between said first and second planar member, and defining a peripheral edge extending between said first and second planar members;
   a hub;
   said disc memory media fixedly mounted to the hub;
   means for mounting said hub into said housing between said first and second planar members so that said hub is free to rotate;
   means for defining a curved door and a radial arm for selectively allowing access to said disc memory media;
   means for mounting said radial arm adjacent said hub with said curved door positioned adjacent and movable relative to said peripheral edge;
   wherein said door has a first portion and a second portion;
   wherein said radial arm is integral with said first portion, and said second portion extends from and is flexible with respect to said first portion;
   means for biasing said door defining means to a closed position;
   means for locking said door in said closed position; and
   wherein said locking means is located on said second portion of said door;

2. The cartridge of claim 1 wherein said locking means includes:
   at least one tab extending from said door; and
   a recess means defined in said housing for receiving said tab.

3. The cartridge of claim 2 wherein said housing has a cured recessed tract and wherein said tab is located in said curved track to guide said door between said closed position and an open position.

4. The cartridge of claim 3 wherein said tab extends substantially parallel to the peripheral edge of the housing.

5. The cartridge of claim 1 wherein said locking means includes:
   at least one tab extending from said door and a recess means defined in said housing for receiving said tab, wherein said tab is located on said second flexible portion, said flexible second portion being positioned by said radial arm so as to urge said tab into said recess means in order to lock the door in a closed position.

6. The cartridge of claim 1 wherein said door includes a catch adapted to be engaged by a lever of a disc drive in order to urge said door to an open position as said cartridge is inserted into a disc drive.

7. The cartridge of claim 1 wherein said second flexible portion of said door includes a catch adapted to be engaged by a lever of a disc drive in order to urge said door to an open position as said cartridge is inserted into a disc drive.

8. The cartridge of claim 7 wherein said door defines an outer curved surface which is substantially parallel to the peripheral edge; and said catch is located on said outer curved surface and is substantially parallel to the outer curved surface.

9. The cartridge of claim 1 wherein said housing includes at least one arc shaped recess located in an inner surface adjacent the disc adapted for providing clearance for a data transfer head of a disc drive.

10. The cartridge of claim 1 wherein a portion of one of said first and second planar members is removed adjacent said door means.

11. The cartridge of claim 10 wherein said removed portion follows substantially the entire curve to said door.

12. The cartridge of claim 1 wherein said peripheral edge is in part beveled such that the cartridge is adapted to be received by a disc drive in only one orientation.

* * * * *

UNITED STATES PATENT AND TRADEMARK OFFICE
CERTIFICATE OF CORRECTION

PATENT NO.   : 4,864,452

DATED        : September 5, 1989

INVENTOR(S)  : Thompson, et al

It is certified that error appears in the above-identified patent and that said Letters Patent is hereby corrected as shown below:

Col. 4, line 19, after "in" and before "art" delete "he" and substitute therefor --the--

Signed and Sealed this

Twenty-eighth Day of August, 1990

Attest:

HARRY F. MANBECK, JR.

Attesting Officer

Commissioner of Patents and Trademarks